(12) United States Patent
Bera et al.

(10) Patent No.: US 10,301,205 B2
(45) Date of Patent: May 28, 2019

(54) WASTE WATER DECONTAMINATION

(71) Applicant: ECOLAB USA INC., St. Paul, MN (US)

(72) Inventors: Tarun Kumar Bera, Pune (IN); Manish Kumar Singh, Magarpatta Pune (IN); Yogesh Bhole, Pune (IN)

(73) Assignee: ECOLAB USA INC., St. Paul, MN (US)

( * ) Notice: Subject to any disclaimer, the term of this patent is extended or adjusted under 35 U.S.C. 154(b) by 36 days.

(21) Appl. No.: 15/124,210

(22) PCT Filed: Feb. 17, 2015

(86) PCT No.: PCT/US2015/016143
§ 371 (c)(1),
(2) Date: Sep. 7, 2016

(87) PCT Pub. No.: WO2015/138092
PCT Pub. Date: Sep. 17, 2015

(65) Prior Publication Data
US 2017/0096357 A1   Apr. 6, 2017

(51) Int. Cl.
*C02F 9/00* (2006.01)
*B01D 21/01* (2006.01)
(Continued)

(52) U.S. Cl.
CPC .............. *C02F 9/00* (2013.01); *B01D 21/01* (2013.01); *B01D 61/025* (2013.01);
(Continued)

(58) Field of Classification Search
None
See application file for complete search history.

(56) References Cited

U.S. PATENT DOCUMENTS 3,388,060 A * 6/1968 Clark .................... C02F 1/5236
                                                        210/714
3,408,293 A    10/1968 Dajani et al.
(Continued)

FOREIGN PATENT DOCUMENTS

EP         0879917 A2 * 11/1998 ............. D21H 17/66
WO    WO 2007/143448 A1    12/2007

OTHER PUBLICATIONS

International Search Report and Written Opinion for International Patent Application No. PCT/US2015/016143, dated May 27, 2015 (10 pages).

*Primary Examiner* — Clare M Perrin
(74) *Attorney, Agent, or Firm* — Eric D. Babych; Brinks Gilson & Lione

(57) ABSTRACT

The present disclosure relates to a formulation and a process for the removal of inorganic impurities from waste water. The formulation consists of a blend of at least one alkali metal aluminate, at least one cationic organic coagulant and optionally at least one alkalinating agent in pre-determined proportions. The process for decontamination using the afore-stated formulation includes steps such as admixing, settling, microfiltration and optionally acidification, ultrafiltration and reverse osmosis. The disclosure further provides an apparatus for the removal of inorganic impurities from waste water.

8 Claims, 1 Drawing Sheet

(51) Int. Cl.
  *B01D 61/02*  (2006.01)
  *B01D 61/14*  (2006.01)
  *C02F 1/56*  (2006.01)
  *C02F 1/52*  (2006.01)
  *C02F 1/00*  (2006.01)
  *C02F 101/10*  (2006.01)
  *C02F 1/44*  (2006.01)
  *C02F 1/66*  (2006.01)

(52) U.S. Cl.
  CPC .......... *B01D 61/147* (2013.01); *C02F 1/5245* (2013.01); *C02F 1/56* (2013.01); *C02F 1/001* (2013.01); *C02F 1/441* (2013.01); *C02F 1/444* (2013.01); *C02F 1/66* (2013.01); *C02F 2001/007* (2013.01); *C02F 2101/10* (2013.01)

(56) References Cited

U.S. PATENT DOCUMENTS

| | | | | |
|---|---|---|---|---|
| 4,053,401 A | * | 10/1977 | Fukushima | C02F 1/52 210/728 |
| 4,559,143 A | * | 12/1985 | Asada | B01D 37/02 210/714 |
| 5,531,907 A | * | 7/1996 | Williams | C02F 1/52 210/727 |
| 5,611,934 A | * | 3/1997 | Shepperd, III | C02F 1/5245 210/719 |
| 6,180,023 B1 | * | 1/2001 | Amer | C02F 1/5236 252/175 |
| 2002/0100731 A1 | * | 8/2002 | Tarbet | C02F 1/5245 210/710 |
| 2003/0132166 A1 | | 7/2003 | Rey | |
| 2006/0039841 A1 | * | 2/2006 | Rico | A01N 37/16 422/305 |
| 2007/0256982 A1 | | 11/2007 | Kelly et al. | |
| 2011/0017677 A1 | | 1/2011 | Evans | |
| 2011/0094963 A1 | | 4/2011 | Tada et al. | |
| 2011/0233124 A1 | * | 9/2011 | Virtanen | C02F 1/5245 210/198.1 |
| 2013/0206702 A1 | * | 8/2013 | Lin | C02F 1/5245 210/728 |
| 2013/0256235 A1 | * | 10/2013 | Kneib | C02F 1/5245 210/728 |

* cited by examiner

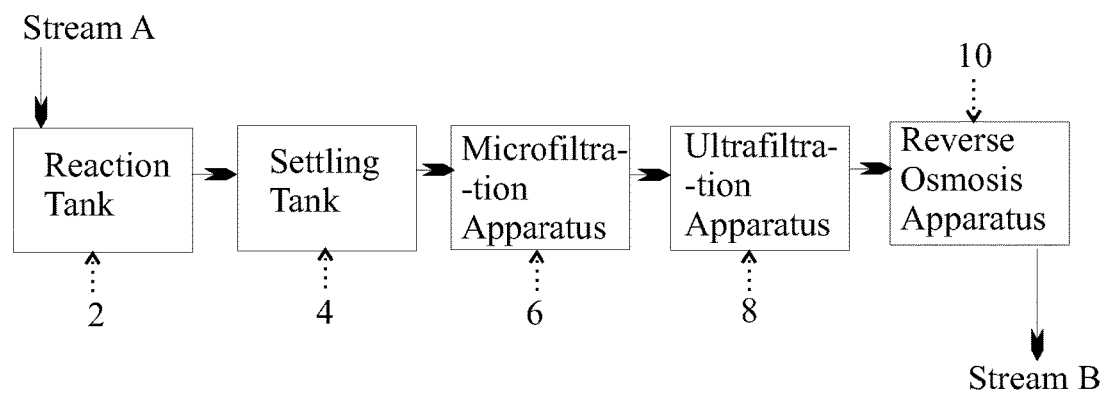

WASTE WATER DECONTAMINATION

FIELD

The present disclosure relates to decontamination of waste water.

BACKGROUND

Waste water that is generated in various industrial processes is commonly loaded with multifarious inorganic species such as $Na^+$, $Ca^{++}$ and $Cl^-$ that preclude its applicability in different downstream purposes. Therefore, removal of inorganic contaminants from the waste water becomes imperative before using the same for recycling purposes.

Conventionally, inorganic contaminant removal has been achieved by the lime-softening process. The process involves use of diverse chemicals such as lime, soda ash, dolomite, ferric chloride and anionic polyelectrolyte that makes the process labor intensive, complex, expensive and thus, prohibitive. The optimization of such diverse chemistries is a very challenging task. Further, in procuring lime from multiple sources, its quality may vary which may lead to sub-optimal precipitation of inorganic contaminants. Even further, high levels of scale forming inorganic contaminants such as $Ca^{2+}$, $Mg^{2+}$ and $SiO_2$ may be carried over to the downstream unit operations such as reverse osmosis (RO) which in turn may result in poor recovery and heavy solid waste (sludge) production.

Use of a variety of chemicals and processes for the decontamination of waste water is known. For example, U.S. Pat. No. 5,611,934 discloses a process for decontaminating dye containing effluents in order to render it suitable for discharge into lagoons or sewers. The process of U.S. Pat. No. 5,611,934 is, however, useful only for removing the coloring principles from the waste water. Similarly, U.S. Pat. No. 3,408,293 discloses a purification process which is specific towards the removal of coal fines and clay from water released by coal preparation plants. However, the specificity of application of the afore-stated processes limits its universal use. Further, use of a host of different varieties of chemicals in the decontamination process increases its complexity along with making the process labor intensive and expensive. Therefore, there a need for an effective process for the decontamination of waste water that reduces the drawbacks associated with prior art processes.

SUMMARY

The present disclosure provides a formulation for the removal of soluble inorganic contaminants from waste water; said formulation comprising a blend of:
i. at least one alkali metal aluminate in an amount ranging from about 90 to about 98% of the total mass of the formulation; and
ii. at least one cationic organic coagulant in an amount ranging from about 2 to about 10% of the total mass of the formulation.

The formulation of the present disclosure further comprises at least one alkalinating agent. In accordance with the formulation of the present disclosure, the alkalinating agent is at least one selected from the group consisting of sodium hydroxide and potassium hydroxide.

In accordance with the formulation of the present disclosure, the alkali metal aluminate is at least one selected from the group consisting of sodium aluminate and potassium aluminate. In an embodiment of the present disclosure, the alkali metal aluminate is sodium aluminate.

In accordance with the formulation of the present disclosure, the organic coagulant is at least one cationic modified polysaccharide selected from the group consisting of cationic starch, cationic guar gum, cationic cellulose, cationic carboxy methyl cellulose (CMC), cationic cellulose derivative, cationic chitin, cationic chitosan, cationic glycan, cationic galactan, cationic glucan, cationic xanthan gum, cationic pectin, cationic mannan and cationic dextrin. In an embodiment of the present disclosure, the organic coagulant is liquid cationic starch.

The present disclosure further provides a process for the preparation of a formulation for the removal of soluble inorganic contaminants from waste water; said process comprises blending with an alkali metal aluminate solution, an alkalinated cationic organic coagulant solution having alkalinity similar to said alkali metal aluminate solution, at a pre-determined temperature and at a pre-determined blending speed to obtain the formulation. In an embodiment of the process of the present disclosure, the pre-determined temperature is a temperature ranging from about 20 to about 50° C. In an embodiment of the process of the present disclosure, the pre-determined blending speed is a blending speed ranging from about 60 to about 200 rpm.

The present disclosure further provides a process for the removal of soluble inorganic contaminants from waste water; said process comprising the following steps:
i. introducing a formulation into waste water bearing inorganic contaminants and having chemical oxygen demand (COD) value less than about 100 ppm for a time period ranging from about 2 to about 5 minutes, at a pH ranging from about 9 to about 11 to obtain a first dispersion comprising precipitated inorganic contaminants;
ii. incorporating at least one flocculating agent in said first dispersion, in an amount ranging from about 0.5 to about 2 ppm to obtain a second dispersion comprising flocculated inorganic contaminants;
iii. allowing said second dispersion to settle for a time period not less than about 30 minutes to yield a supernatant layer of water and a sludge layer comprising settled flocculated inorganic contaminants;
iv. separating said supernatant layer to obtain separated supernatant layer; and
v. subjecting said separated supernatant layer to microfiltration to obtain microfiltered water,
wherein said formulation comprises:
a. at least one alkali metal aluminate in an amount ranging from about 90 to about 98% of the total mass of the formulation; and
b. at least one cationic organic coagulant in an amount ranging from about 2 to about 10% of the total mass of the formulation.

In accordance with the process of the present disclosure, the waste water bearing inorganic contaminants can have a chemical oxygen demand (COD) value less than about 50 ppm.

The process of the present disclosure further includes the step of introducing soda ash into the waste water in step (i), if the waste water contains permanent Ca-hardness of more than about 150 ppm.

In accordance with the process of the present disclosure, the flocculating agent is at least one selected from the group consisting of cationic flocculant, anionic flocculant and non-ionic flocculant. In an embodiment of the process of the present disclosure, the flocculating agent is an anionic polymer having structure selected from the group consisting of linear, branched and cross-linked, physical state selected from the group consisting of solid and liquid and characterized by:
   a. molecular weight ranging from about 0.5 to about 50 million; and
   b. charge density ranging from about 0.1 to about 100%.

The flocculating agent can be selected from the group consisting of poly acrylic acid, poly acrylic amide and acrylic acid-acrylic amide copolymer.

The process of the present disclosure further comprises the step of subjecting said microfiltered water to acidification, followed by ultrafiltration and then reverse osmosis (RO) to obtain decontaminated water.

In accordance with the process of the present disclosure, the step of acidification comprises adjusting the pH in the range of about 6.0 to about 7.0 with at least one acid selected from the group consisting of hydrochloric acid, sulfuric acid, nitric acid, hydrobromic acid and perchloric acid to precipitate $Al^{3+}$ ions.

The present disclosure further provides a kit for the removal of soluble inorganic contaminants from waste water; said kit comprising:
   i. at least one component comprising at least one alkali metal aluminate solution;
   ii. at least one component comprising at least one cationic organic coagulant solution;
   iii. at least one component comprising at least one alkalinating agent solution;
   iv. at least one component comprising at least one flocculating agent; and
   v. at least one component comprising soda ash.

Still, further, the process of the present disclosure provides an apparatus for the removal of soluble inorganic contaminants from waste water; said apparatus comprising:
   i. a reaction tank (2) selected from the group consisting of a flash mixer, a static mixer, a loop mixer and combinations thereof, adapted to receive waste water bearing inorganic contaminants and a formulation to generate a first dispersion comprising precipitated inorganic contaminants;
   ii. a settling tank (4) selected from the group consisting of a clarifier, a tube settler and combinations thereof, adapted to receive said first dispersion and at least one flocculating agent to obtain a second dispersion comprising flocculated inorganic contaminants and further adapted to settle said second dispersion to generate a supernatant layer of water and a sludge layer comprising settled flocculated inorganic contaminants;
   iii. a micro filtration apparatus (6) selected from the group consisting of dual media filter (DMF), pressure sand filter (PSF), multi grade filter (MGF), cartridge filter, auto back washable filter and combinations thereof, adapted to receive said supernatant layer of water to yield microfiltered water;
   iv. an ultrafiltration apparatus (8) having ultrafiltration membrane molecular weight cut-off ranging from about 1,00,000 to about 1,50,000 Daltons, at least one configuration selected from the group consisting of in to out configuration, out to in configuration and submerged configuration and adapted to receive said microfiltered water and at least one acid to obtain ultrafiltered water; and
   v. a reverse osmosis apparatus (10) adapted to receive said ultrafiltered water to yield decontaminated water.

BRIEF DESCRIPTION OF THE ACCOMPANYING DRAWINGS

The disclosure will now be described with reference to the accompanying non-limiting drawing:

FIG. 1 shows a schematic representation of the apparatus for the removal of soluble inorganic contaminants from waste water in accordance with the present disclosure, wherein:
2 represents a reaction tank;
4 represents a settling tank;
6 represents a microfiltration apparatus;
8 represents an ultrafiltration apparatus;
10 represents a reverse osmosis apparatus;
Stream A represents waste water bearing inorganic contaminants; and
Stream B represents the decontaminated water.

DETAILED DESCRIPTION

Conventional waste water decontamination techniques suffer from certain drawbacks such as complex treatment sequences, use of too many chemicals and labor intensive process. Further, there is a significant amount of solid waste production. The present disclosure provides a formulation and a process for the decontamination of waste water generated from various industrial sources that reduces the afore-stated disadvantages.

In accordance with one aspect of the present disclosure, a formulation for the removal of soluble inorganic contaminants from waste water is provided. The formulation comprises a blend of at least one alkali metal aluminate and at least one cationic organic coagulant. The formulation optionally contains at least one alkalinating agent.

The alkali metal aluminate of the present disclosure is at least one selected from the group that includes but is not limited to sodium aluminate and potassium aluminate. In one embodiment, the alkali metal aluminate is sodium aluminate. The alkali metal aluminate is present in the formulation in an amount ranging between about 90 and about 98% of the total mass of the formulation. The alkali metal aluminate functions as a precipitating agent; in that it precipitates various inorganic contaminants present in the waste water.

The cationic organic coagulant included in the formulation of the present disclosure needs to be compatible with the alkali metal aluminate used in the formulation. The cationic organic coagulant is a cationic modified polysaccharide selected from the group that includes but is not limited to cationic starch, cationic guar gum, cationic cellulose, cationic carboxy methyl cellulose (CMC), cationic cellulose derivative, cationic chitin, cationic chitosan, cationic glycan, cationic galactan, cationic glucan, cationic xanthan gum, cationic pectin, cationic mannan and cationic dextrin. In one embodiment, the cationic organic coagulant is cationic starch. Cationic starch is starch marked with a cationic group. Typically, the cationic organic coagulant is included in an amount ranging between about 2 and about 10% of the total mass of the formulation. The cationic coagulant acts as a sludge compacting agent. The coagulant helps to draw out water from the sludge, reducing the sludge volume; thereby rendering the system easy to handle.

The formulation of the present disclosure optionally includes at least one alkalinating agent in order to make the pH of the cationic starch solution compatible with that of the alkali metal aluminate solution. The alkalinating agent of the present disclosure is at least one selected from the group consisting of sodium hydroxide and potassium hydroxide. Typically, the alkalinating agent is sodium hydroxide. In one embodiment, the alkalinating agent is a 10% sodium hydroxide solution in deionized water.

In accordance with another aspect, a process for the preparation of the formulation of the present disclosure is provided. The process includes blending an alkali metal aluminate solution with an alkalinated cationic organic coagulant solution to obtain the formulation. The cationic organic coagulant solution is alkalinated with the aid of at least one alkalinating agent solution. The alkali metal aluminate solution, which in one embodiment is the sodium aluminate solution, has pH ranging between about 12 and about 14. Cationic starch solution is the cationic organic coagulant solution of the present disclosure, in one embodiment. However, the pH of the cationic starch solution ranges between about 4 and about 9. Therefore, before blending, the pH of the two solutions is adjusted to lie in a common range, for example a pH of 12-14. In order to match the pH of the alkali metal aluminate solution, an alkalinating agent solution is admixed with the cationic organic coagulant solution. The alkalinating agent of the present disclosure is at least one selected from the group consisting of sodium hydroxide and potassium hydroxide. Typically, the alkalinating agent is sodium hydroxide. In one embodiment, the alkalinating agent is a 10% sodium hydroxide solution in deionized water. Typically, the temperature at which blending takes place ranges between about 20 and about 50° C. and the blending speed ranges between 60 and 200 rpm.

The alkali metal aluminate is at least one selected from the group that includes but is not limited to sodium aluminate and potassium aluminate. Further, the organic coagulant is at least one cationic modified polysaccharide selected from the group that includes but is not limited to cationic starch, cationic guar gum, cationic cellulose, cationic carboxy methyl cellulose (CMC), cationic cellulose derivative, cationic chitins, cationic chitosans, cationic glycans, cationic galactans, cationic glucans, cationic xanthan gums, cationic pectins, cationic mannans and cationic dextrins.

In accordance with yet another aspect, a process for removal of soluble inorganic contaminants from waste water using the formulation of the present disclosure is provided. The process initially includes introducing a formulation into waste water typically obtained from sources such as blow down from a cooling tower, a bore well, a de-mineralization plant that yields discharge, oil field that generates water, or an ore refinery that yields wash-water. The waste water typically contains soluble inorganic contaminants including but not limited to $Na^+$, $Ca^{++}$, $Mg^{2+}$, $SiO_2$, $PO_4^{3-}$, $F^-$ and $Cl^-$. Preferably, waste water treated by the process of the present disclosure has a chemical oxygen demand (COD) value of less than about 100 ppm. Typically, the waste water has a chemical oxygen demand (COD) value of less than about 50 ppm.

The formulation of the present disclosure is a blend comprising at least one alkali metal aluminate, at least one organic coagulant and optionally at least one alkalinating agent in specific proportions. The alkali metal aluminate, which in one embodiment is sodium aluminate, functions as a precipitating agent; in that it precipitates various inorganic contaminants present in the waste water. The cationic organic coagulant, in one embodiment, is cationic starch and is included in an amount ranging between about 2 and about 10% of the total mass of the formulation. The cationic coagulant acts as a sludge compacting agent wherein water is drawn out of the sludge, reducing the sludge volume; thereby rendering the system easy to handle. In one embodiment, the alkalinating agent is a 10% sodium hydroxide solution in deionized water. The alkalinating agent is typically included in order to make the pH of the cationic starch solution compatible with or similar to that of the alkali metal aluminate solution.

Upon contact with the alkali metal aluminate in the formulation of the present disclosure, the inorganic species precipitate leading to the formation of a first dispersion. The step of introducing is carried out for a time period ranging between about 2 and about 5 minutes and at a pH ranging between about 9 and about 11 to achieve maximum precipitation. Optionally, soda ash is also introduced into the waste water along with the present formulation in order to remove $Ca^{++}$ ions, if the permanent Ca-hardness of the waste water is more than about 150 ppm. The step of introducing the formulation into the waste water is carried out in at least one apparatus selected from the group that includes but is not limited to flash mixer, static mixer and loop mixer.

To the resultant first dispersion, at least one flocculating agent is added in an amount ranging between about 0.5 and about 2 ppm to obtain a second dispersion. The second dispersion comprises flocculated inorganic contaminants. The flocculating agent of the present disclosure is at least one selected from the group that includes but is not limited to cationic flocculant, anionic flocculant and non-ionic flocculant. In one embodiment, the flocculating agent is an anionic polymer. The structure of the flocculating agent is selected from the group that includes but is not limited to linear, branched and cross-linked whereas the physical state is selected from the group that includes but is not limited to solid and liquid. The molecular weight of the flocculating agent ranges between about 0.5 and about 50 million and the charge density ranges between about 0.1 and about 100%. Typically, the flocculating agent is selected from the group that includes but is not limited to poly acrylic acid, poly acrylic amide and acrylic acid-acrylic amide copolymer.

The second dispersion is further allowed to settle for a time period not less than about 30 minutes to yield a sludge layer and a supernatant layer of water. The step of allowing the second dispersion to settle is carried out in an apparatus selected from the group that includes but is not limited to clarifier and tube settler. The sludge layer comprises settled flocculated inorganic contaminants whereas the supernatant is devoid of soluble inorganic contaminants.

The sludge and the supernatant layer are separated in at least one apparatus selected from the group that includes but is not limited to clarifier, tube settler, skimmer and weir.

The separated sludge layer containing the settled flocculated inorganic contaminants is subjected to dewatering and the resultant extracted water is recycled for downstream processes.

The supernatant layer of water may contain some fine suspended matter carried over from the previous steps which is removed by subjecting it to microfiltration. A microfiltration process can be used to separate particles having particle size greater than about 10 microns and yields microfiltered water. The microfiltration step can be carried out in at least one apparatus selected from the group that includes but is not limited to dual media filter (DMF), pressure sand filter (PSF), multi grade filter (MGF), cartridge filter, and auto back washable filter.

The resultant microfiltered water is optionally subjected to further purification techniques such as reverse osmosis, depending upon the end applications. However, if $Al^{3+}$ ions are present in the microfiltered water, they may move downstream and soil the RO membrane. In order to counter this, the process of RO is generally accompanied by the steps of acidification and ultrafiltration. The step of acidification adjusts the pH of the microfiltered water to range between about 6.5 and about 7, in order that the $Al^{3+}$ ions precipitate out as $Al(OH)_3$. At least one acid selected from the group that includes but is not limited to hydrochloric acid, sulfuric acid, nitric acid, hydrobromic acid and perchloric acid is used to precipitate out $Al^{3+}$. In one embodiment, hydrochloric acid is used in the acidification step. Application of HCl in the process of the present disclosure makes the process of removal of soluble inorganic contaminants from waste water, economical. The precipitated $Al(OH)_3$ is removed by ultrafiltration in at least one apparatus selected from the group that includes but is not limited to tubular membrane and capillary membrane. The ultrafiltration molecular weight cut-off is not limited to but can be in the range between about 1,00,000 and about 1,50,000 Daltons. The ultrafiltration system, in one embodiment, is 'in to out'. The ultrafiltration system, in another embodiment, is 'out to in'. The ultrafiltration system, in yet another embodiment, is of submerged configuration.

The present disclosure even further provides a kit for the removal of soluble inorganic contaminants from waste water, wherein the kit comprises at least one component comprising at least one alkali metal aluminate solution, at least one component comprising at least one cationic organic coagulant solution, at least one component comprising at least one alkalinating agent solution, at least one component comprising at least one flocculating agent and at least one component comprising soda ash.

Still further the present disclosure provides an apparatus for the removal of soluble inorganic contaminants from waste water. The apparatus includes a reaction tank (2), a settling tank (4), a micro filtration apparatus (6), an ultrafiltration apparatus (8) and a reverse osmosis apparatus (10) to yield decontaminated water.

The clean water obtained as a result of the process of the present disclosure can be used for diverse applications that include but are not limited to cooling tower make-up water, boiler make-up water, oil refinery de-salting process water, oilfield injection water, ore refinery process water, chemical industry process water and textile industry process water. The process steps including the optional steps can be adjusted depending on the end applications. Significantly, the present process yields comparatively less amounts of solid waste and increases the percentage of silicon dioxide removal.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The expression "at least" or "at least one" is intended to suggest the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

The following examples are provided to further illustrate embodiments of the present disclosure and should be construed to limit the scope of the disclosure.

Example 1: Preparation of a Formulation of the Present Disclosure 0.1 g of sodium hydroxide was initially admixed in 0.9 g of deionized water to obtain 10% sodium hydroxide solution. This 10% sodium hydroxide solution was further admixed with 40 g of cationic starch solution (ISC 2500N, pH 6.5) procured from Industrial Specialty Chemical (ISC) Inc., USA, to yield alkalinated cationic starch solution having pH 12.5. This alkalinated cationic starch solution was then blended with 2 kg of liquid sodium aluminate (Nalco 2, pH 12.5) obtained from Nalco at 25° C. at 150 rpm to obtain 2.041 kg of the formulation of the present disclosure.

Example 2: Process for Removal of Inorganic Contaminants

In laboratory jar testers, multiple trials were carried out where waste water (cooling tower blowdown) from steel industry was dosed with 400 ppm of the formulation prepared in Example 1 and admixed for a time interval ranging between 3 and 5 minutes. 1 ppm of an anionic flocculant (powder copolymer of acrylic acid and acryl amide with mole ratio 3:7) was then added to each of the resultant mixture and was allowed to settle for 30 minutes. In each case, the supernatant layers were filtered in glass filtration flasks loaded with 20 micron filter papers followed by pH adjustment to 6.5-7.0 and dead-end ultrafiltration in a dead-end filtration cell loaded with 1,00,000 Daltons polyvinylidene fluoride (PVDF) ultrafiltration membrane. The decontaminated water obtained after every trial was analyzed; results of some of trials are presented herein below:

TABLE 1

Extent of contaminant reduction for different trials

| | | Example 1a | | Example 1b | | Example 1c | |
|---|---|---|---|---|---|---|---|
| Sr. No. | Parameter | Untreated Water | Treated water after ultrafiltration | Untreated Water | Treated water after ultrafiltration | Untreated Water | Treated water after ultrafiltration |
| 1 | pH | 7.9 | 6.9 | 7.8 | 6.9 | 7.8 | 7.4 |
| 2 | Conductivity (micro S/cm) | 1600 | 2300 | 1500 | 1800 | 1000 | 1400 |
| 3 | Total Hardness as $CaCO_3$ (ppm) | 400 | 280 | 300 | 200 | 200 | 120 |

TABLE 1-continued

Extent of contaminant reduction for different trials

| | | Example 1a | | Example 1b | | Example 1c | |
|---|---|---|---|---|---|---|---|
| Sr. No. | Parameter | Untreated Water | Treated water after ultrafiltration | Untreated Water | Treated water after ultrafiltration | Untreated Water | Treated water after ultrafiltration |
| 4 | Total Alkalinity as CaCO₃ (ppm) | 31 | 32 | 31 | 25 | 31 | 32 |
| 5 | Total SiO₂ (ppm) | 100 | 24 | 100 | 25 | 100 | 22 |
| 6 | Total PO₄ (ppm) | <0.3 | <0.3 | <0.3 | <0.3 | <0.3 | <0.3 |
| 7 | Fluoride (ppm) | 5.25 | 3.3 | 4 | 1.2 | 3 | 1.9 |

The reduction in the hardness and silica content after treatment using the present process and formulation is evident in Table 1.

Example 3: Process for Removal of Inorganic Contaminants

In laboratory jar testers, several trials were conducted where waste water (cooling tower blowdown) from steel industry was dosed with varying levels of the present formulation along with soda ash and admixed for a time interval ranging between 3 and 5 minutes. In each case, powder copolymer of acrylic acid and acryl amide with mole ratio 3:7 was added to the resultant mixtures as an anionic flocculant and was allowed to settle for 30 minutes. The supernatant layers were filtered in a glass filtration flask loaded with a 20 micron filter paper followed by pH adjustment to 6.5-7.0 and dead-end ultrafiltration in a dead-end filtration cell loaded with 1,00,000 Daltons polyvinylidene fluoride (PVDF) ultrafiltration membrane. The ultrafiltered water obtained in each case was subjected to reverse osmosis in a dead-end filtration cell loaded with Dow BW-30 RO membrane. The decontaminated water that resulted in each case was analyzed at different stages of the present process and the results obtained (averages) are demonstrated herein below:

TABLE 2

Extent of contaminant reduction at different stages of the present process

| Sr. No. | Parameter | Un-treated Water | After Settling System | After micron filter | After Ultra-filtration | After Reverse Osmosis (RO) |
|---|---|---|---|---|---|---|
| 1 | pH | 7.4 | 9.1 | 8.1 | 7.0 | 7.9 |
| 2 | Conductivity (micro S/cm) | 2200 | 2700 | 3000 | 3000 | 130 |
| 3 | Total Hardness as CaCO₃ (ppm) | 730 | 360 | 510 | 510 | 4.2 |
| 4 | Total Alkalinity as CaCO₃ (ppm) | 36 | 140 | 140 | 140 | <25 |
| 5 | Total SiO₂ (ppm) | 110 | 22 | 24 | 21 | 0.8 |
| 6 | Total PO₄ (ppm) | 18 | 2.6 | 3.8 | 3.8 | <0.6 |
| 7 | Fluoride (ppm) | 2.7 | 2.6 | 2.7 | 2.7 | <0.06 |

The gradual reduction in the hardness and silica content of the waste water after undergoing the process steps of the present disclosure is evident in Table 2.

Analysis of the Extent of Contaminant Reduction Achieved Using Different Water Samples and Formulation Dosing:

3a] Waste Water Sample: High Hardness & High Silica Water

Dosing: 800 ppm of the present formulation, 1000 ppm of soda ash and 1 ppm of anionic flocculant 3b] Waste Water Sample: High Hardness & Low Silica Water Dosing: 250 ppm of the present formulation, 1000 ppm of soda ash and 1 ppm of anionic flocculant 3c] Waste Water Sample: Medium Hardness & High Silica Water Dosing: 650 ppm of the present formulation, 400 ppm of soda ash and 1 ppm of anionic flocculant

TABLE 3

Extent of contaminant reduction for different water samples and formulation dosing

|  |  | Example 3a | | Example 3b | | Example 3c | |
| --- | --- | --- | --- | --- | --- | --- | --- |
| Sr. No. | Parameter | Untreated Water | Treated Water after ultrafiltration | Untreated Water | Treated Water after ultrafiltration | Untreated Water | Treated Water after ultrafiltration |
| 1 | pH | 7.6 | 6.7 | 7.7 | 6.8 | 7.8 | 6.8 |
| 2 | Conductivity (micro S/cm) | 5500 | 6600 | 5000 | 5900 | 4500 | 5300 |
| 3 | Total Hardness as $CaCO_3$ (ppm) | 1257 | 340 | 1257 | 480 | 655 | 230 |
| 4 | Total Alkalinity as $CaCO_3$ (ppm) | 140 | 170 | 140 | 160 | 140 | 100 |
| 5 | Total $SiO_2$ (ppm) | 200 | 29 | 34 | 8.4 | 200 | 24 |
| 6 | Total $PO_4$ (ppm) | 5 | 4.6 | 5 | 3.6 | 5 | 4.6 |
| 7 | Fluoride (ppm) | 11.6 | 5 | 11.6 | 4 | 11.6 | 4 |

The reduction in the hardness and silica content after treatment using the present process and formulation is evident in Table 3.

Example 4: Contaminant Reduction

Waste water sample obtained from power industry (medium hardness & medium silica water) in the form of cooling tower blowdown was subjected to inorganic contaminant removal using a process of the present disclosure as well as a conventional lime softening process. The results obtained are presented in the following table:

TABLE 4

Extent of contaminant reduction after treatment with the present process versus the process of lime softening

|  |  |  | Treated Water using | |
| --- | --- | --- | --- | --- |
| Sr. No. | List of Parameters | Untreated Water | Lime | Present Process |
| 1 | pH | 7.4 | 6.8 | 6.8 |
| 2 | Conductivity (microS/cm) | 2200 | 3600 | 3000 |
| 3 | Total Hardness as $CaCO_3$ | 720 | 430 | 510 |
| 4 | Total Alkalinity as $CaCO_3$ | 36 | 38 | 140 |
| 5 | Total $SiO_2$ (ppm) | 110 | 31 | 21 |
| 6 | Total $PO_4$ (ppm) | 18 | 5 | 3.8 |
| 7 | Fluoride (ppm) | 2.7 | 1.9 | 2.7 |
| 8 | Aluminum (ppm) | 0.14 | 0.065 | 0.1 |
| 9 | Dry Sludge Quantity (kg/100 m$^3$) | NA | 130 | 32 |

It was observed that the process of the disclosure provided better results for silica removal and lowered the sludge production when compared to the conventional lime-softening process. Further, the process of the present disclosure employed a fewer number of chemicals and required fewer reaction steps; thereby making the process of decontamination simple and providing a useful alternative to the prior art processes.

Example 5: Comparison of Results Obtained by Sodium Aluminate Versus Results Obtained by a Formulation of the Present Disclosure Removal of inorganic contaminants from waste water obtained from power industry using sodium aluminate alone, and a formulation of the present disclosure was compared. A procedure similar to the one presented in Example 3 was carried out.

Sodium aluminate alone: 400 ppm liquid sodium aluminate+400 ppm soda ash+1 ppm of anionic flocculant
Present Formulation: 400 ppm present formulation+400 ppm soda ash+1 ppm of anionic flocculant
The results obtained are as follows:

TABLE 5

Comparative analysis of the results obtained by using sodium aluminate alone as opposed to the formulation as a whole

|  |  |  | Analysis of treated water after ultrafiltration using | |
| --- | --- | --- | --- | --- |
| Sr. No. | Parameter | Untreated Water | Sodium aluminate alone | Present formulation |
| 1 | pH | 7.4 | 6.8 | 6.8 |
| 2 | Conductivity (micro S/cm) | 2200 | 3000 | 3000 |
| 3 | Total Hardness as $CaCO_3$ (ppm) | 720 | 470 | 510 |
| 4 | Total Alkalinity as $CaCO_3$ (ppm) | 36 | 120 | 140 |
| 5 | Total $SiO_2$ (ppm) | 110 | 21 | 18 |
| 6 | Total $PO_4$ (ppm) | 18 | 5.2 | 3.8 |
| 7 | Fluoride (ppm) | 2.7 | 2.9 | 2.7 |
| 8 | Dry sludge quantity (kg/100 m3) | NA | 35 | 32 |

Use of the formulation of the present disclosure, not only reduced the silica content of the waste water but also resulted in the generation of a lesser quantity of the dry sludge. This made the process easy to conduct and handle. Further, use of organic coagulant in the form of cationic starch neutralized the charges on the precipitated inorganic contaminants which enabled the contaminants to grow larger in size. As the large sized precipitate will have a smaller amount of trapped water, the sludge volume was reduced even further when compared to using sodium aluminate alone.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

We claim:

1. A process for removal of soluble inorganic contaminants from waste water; said process comprising:
   i. introducing a formulation into waste water bearing inorganic contaminants and having chemical oxygen demand (COD) value less than about 100 ppm, the introducing taking place over a time period ranging from about 2 to about 5 minutes, at a pH ranging from about 9 to about 11 to obtain a first dispersion comprising precipitated inorganic contaminants;
   ii. incorporating at least one flocculating agent in said first dispersion, in an amount ranging from about 0.5 to about 2 ppm to obtain a second dispersion comprising flocculated inorganic contaminants;
   iii. allowing said second dispersion to settle for a time period not less than 30 minutes to yield a supernatant layer of water and a sludge layer comprising settled flocculated inorganic contaminants;
   iv. separating said supernatant layer to obtain a separated supernatant layer; and
   v. subjecting said separated supernatant layer to microfiltration to obtain microfiltered water,
   wherein said formulation comprises:
      a. at least one alkali metal aluminate in an amount ranging from about 90 to about 98% of the total mass of the formulation; and
      b. at least one cationic organic coagulant in an amount ranging from about 2 to about 10% of the total mass of the formulation.

2. The process of claim 1, wherein said waste water bearing inorganic contaminants comprises a chemical oxygen demand (COD) value less than about 50 ppm.

3. The process of claim 1, further comprising introducing soda ash into the waste water in step (i) along with the formulation, if the waste water contains permanent Ca-hardness of more than about 150 ppm.

4. The process of claim 1, wherein said flocculating agent comprises at least one of cationic flocculant, anionic flocculant and non-ionic flocculant.

5. The process of claim 1, wherein said flocculating agent comprises a linear, branched or cross-linked anionic polymer in solid or liquid form and characterized by:
   a. molecular weight ranging from about 0.5 to about 50 million; and
   b. charge density ranging from about 0.1 to about 100%.

6. The process of claim 1, wherein said flocculating agent is selected from the group consisting of poly acrylic acid, poly acrylamide and acrylic acid-acrylamide copolymer.

7. The process of claim 1, further comprising subjecting said microfiltered water to acidification, followed by ultrafiltration and then reverse osmosis (RO) to obtain decontaminated water.

8. The process of claim 7, wherein said acidification comprises adjusting the pH in the range of about 6.0 to about 7.0 with at least one acid selected from the group consisting of hydrochloric acid, sulfuric acid, nitric acid, hydrobromic acid, and perchloric acid to precipitate $Al^{3+}$ ions.

* * * * *

UNITED STATES PATENT AND TRADEMARK OFFICE
CERTIFICATE OF CORRECTION

PATENT NO. : 10,301,205 B2
APPLICATION NO. : 15/124210
DATED : May 28, 2019
INVENTOR(S) : Tarun Kumar Bera et al.

Page 1 of 1

It is certified that error appears in the above-identified patent and that said Letters Patent is hereby corrected as shown below:

On the Title Page

Item (65) "Prior Publication Data", below "US 2017/0096357 A1 Apr. 6, 2017" insert:
--Foreign Application Priority Data
Mar. 12, 2014 (IN) ............... 830/MUM/2014--

Signed and Sealed this
Seventeenth Day of September, 2019

Andrei Iancu
*Director of the United States Patent and Trademark Office*